March 1, 1960

M. WEIDIG 2,926,554

HYDRAULIC SPINDLE BALANCE

Filed April 21, 1958

INVENTOR.
MILES WEIDIG.
BY
ATTORNEY.

March 1, 1960 M. WEIDIG 2,926,554
HYDRAULIC SPINDLE BALANCE
Filed April 21, 1958 7 Sheets-Sheet 4

INVENTOR.
MILES WEIDIG.
BY
ATTORNEY.

March 1, 1960

M. WEIDIG 2,926,554

HYDRAULIC SPINDLE BALANCE

Filed April 21, 1958

INVENTOR.
MILES WEIDIG.
BY
ATTORNEY.

March 1, 1960  M. WEIDIG  2,926,554
HYDRAULIC SPINDLE BALANCE
Filed April 21, 1958  7 Sheets-Sheet 6

INVENTOR.
MILES WEIDIG.
BY
ATTORNEY.

March 1, 1960 M. WEIDIG 2,926,554
HYDRAULIC SPINDLE BALANCE
Filed April 21, 1958 7 Sheets-Sheet 7

INVENTOR.
MILES WEIDIG.
BY
ATTORNEY.

United States Patent Office 2,926,554
Patented Mar. 1, 1960

2,926,554
HYDRAULIC SPINDLE BALANCE

Miles Weidig, Kenwood, Ohio, assignor to The Carlton Machine Tool Company, Cincinnati, Ohio, a corporation of Ohio Application April 21, 1958, Serial No. 729,720

10 Claims. (Cl. 77—36)

My invention relates to drilling machine tools and more particularly to a servo operated hydraulic spindle counterbalance for a drilling machine.

In drilling machinery such as the type known in the art as a radial drill, it is desirable to move the spindle or toolholding member in the head of the radial drill to an operative position, and to return it to an inoperative position. To accomplish this movement a clutch is provided. The power drive may be disconnected to provide for manual traversing of the spindle. The spindle is so constructed that it is adapted to carry a cutting tool at its lower end, which engages with the work to perform the desired drilling, tapping, reaming or boring operation.

In order to adequately compensate for the movement of the spindle to and from its work position, and by reason of the weight of the spindle and the metal cutting tools attached thereto, it is necessary in drilling machinery to have a counterbalance of the spindle to provide for ease of operation and safety to the operator and to provide in general for operativeness of the drilling machine.

Heretofore, it was found necessary to provide the drilling machine particularly the head portion of the drilling machine in which the spindle is housed with a counterbalance which approximated in weight the movable parts of the spindle. This counterbalance would take the form of weights, such as lead weights, or, in some instances, springs have been provided with means of relieving the tension on the springs to compensate for the weight of the spindle and its tool cutting member when a tool is mounted therein.

In my invention I employ a hydraulic unit connected with the spindle which is supplied with oil under variable pressure to compensate for the additional weight secured to the spindle, such additional weight is in the form of tools, boring bars, reamers, taps and drill heads. The compensatory device which I employ in my invention permits the traversing of the spindle in and out of the head carrying the transmission mechanism by the operator with a minimum of effort so that by touching the operating levers connected to the traversing mechanism, the operator may position the spindle with its load at any desired position, and by reason of my invention, the spindle will remain in that selected position until further action by the operator. In the operation of drilling machinery, it is sometimes necessary to affix tools to the spindle, which tools may weigh as much as 500 or more pounds. This presents a problem in counterbalancing. It is, therefore, the principal object of my invention to provide a means of automatically counterbalancing large boring bars, drill heads, and other tools which are affixed to the spindle.

Another object of my invention is to provide a device or mechanism which does not permit any change in the position of the spindle when heavier tools are removed or are added. It does not require the disassembly of the operating mechanism by the operator in order to provide methods and means of holding heavy boring bars and drill heads to the spindle, such as has been encountered heretofore in the operation of drilling machinery. In addition, radial drills prior to my invention have been provided with spring compensating mechanisms which have been adjusted by the operator of the machine with reference to the weight of the tool which is added or removed from the spindle. No means has been found effective to adequately gauge and adjust the spring counterbalance for all types of tools so that the operator estimates what force is required to properly counterbalance and must experiment sometimes for a long period of time resulting in higher costs for drilling operations. Quite often an error in judgment by the operator in adjusting a variable spring causes damage to tools and other parts. Oftentimes operators have been injured when they have incorrectly estimated the amount of tension required to hold a particular tool attached to the spindle of the drill.

In my invention, all of these operations are eliminated. It is, therefore, another object of my invention to provide a radial drilling machine having a head with a tool carried therein which is so made and constructed that the operator need not make any adjustments regardless of the weight or size of the tool which is affixed to the spindle.

It is another object of my invention to provide for a supply of variable pressure to the mechanism so that no adjustment or operation is necessary by the operator.

It is another object of my invention to provide for an automatic instantaneous selection of the necessary pressure to counterbalance the weights of tools and other devices added to the spindle.

Other objects and objects relating to details of construction and economies of operation will definitely appear from the detailed description to follow. In one instance, I have accomplished the objects of my invention by the devices and means set forth in the following specification. My invention is clearly defined and pointed out in the appended claims. Structures useful in carrying out my invention are illustrated in the accompanying drawings forming a part of this specification in which:

Figure 8 is a view in front elevation showing a portion of the head in section and illustrating the spindle and hydraulic cylinder.

In the drawings the same reference numerals refer to the same parts throughout the several views, and the sectional views are taken looking in the direction of the arrows at the ends of the section lines.

In general, my invention comprises a hydraulic valve mechanism interconnected with a manually-operable device for traversing a spindle and its load in the head of a drilling machine. The hydraulic valve comprises a rotary spool, mounted within a rotatable sleeve, which controls the flow of fluid to a cylinder. The fluid pressure actuates the piston which is slid within the hydraulic cylinder. The piston is connected to the spindle to control the movement of the spindle.

The operation of the cylinder is actuated by moving a lever connected to the valve spool. The movement of the valve spool against a fixed surface connected to the head in relation to the position of the valve sleeve, causes fluid to flow to the cylinder. The further movement of the rotatable valve sleeve, with reference to the rotatable spool, permits a variable volumetric flow of fluid to the cylinder. This variable volumetric flow of fluid to the cylinder causes the static pressure in the cylinder to assume a value which will exactly balance the spindle and retain it in a position selected by the previous rotation of the manually-operable levers.

The above-described mechanism illustrates the operation of the spindle and tool balancing mechanism. The same mechanism also acts as a means of traversing the spindle by power.

The spindle is normally in its position of rest, disengaged from the transmission mechanism carried in the head. The operator rotates the levers at a speed which regulates the volume of oil allowed to flow to or from the cylinder dependent upon the direction of traverse of the spindle. In other words, the operator rotates the levers at whatever speed he desires the spindle to be traversed. This movement automatically provides for the balancing of the spindle on account of its weight or on account of the added weight of the tool carried by the spindle.

When the operator stops rotating the levers, the spindle is automatically balanced in its stopped position. This is accomplished in my invention by the balancing action described above.

Figures 1, 2:
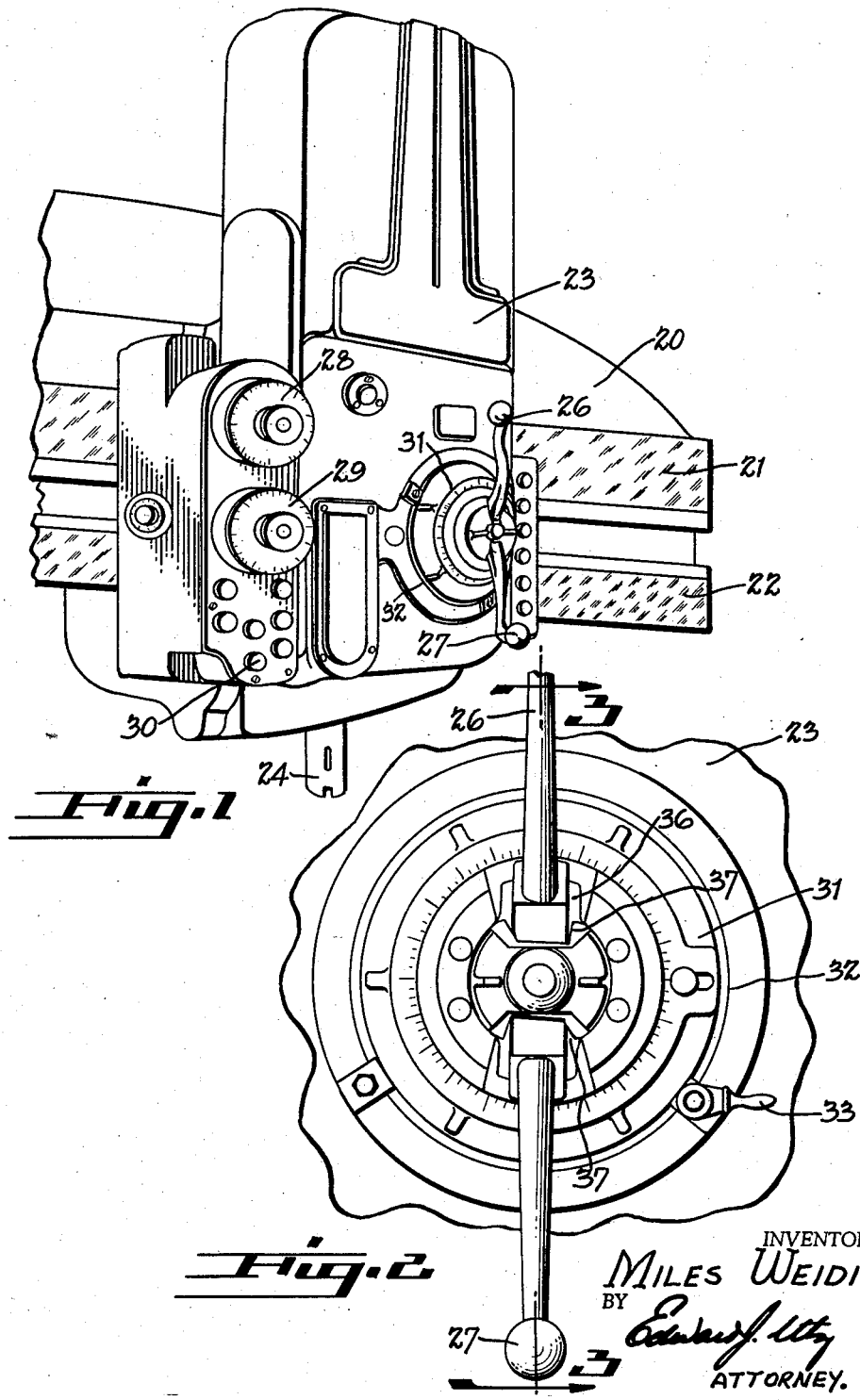
Figure 1 shows a drill head of a radial drilling machine mounted for sliding movement.
Figure 2 is a view of the operating levers for controlling the movement of the spindle and shows a depth dial affixed to the head mechanism.

Referring to the numbered parts of the drawing, the invention is disclosed as embodied in a radial drill having an arm 20, provided with a pair of spaced ways 21 and 22, upon which a head 23 is slidable. The head is provided with a transmission mechanism for a spindle 24. The spindle assembly of the drilling machine consists of a sleeve 25 translatably mounted in the drill head with a rotatable spindle 24, journalled in it. The lower end of the spindle has a tapered bore to engage frictionally a drill, tap, or other tool having a corresponding tapered shank. In Figure 1 I show spindle levers 26 and 27 which are used to traverse the spindle 24, and are moved laterally to engage or disengage a clutch mechanism to cause the spindle to be engaged or disengaged with the transmission mechanism carried in the head.

The transmission mechanism in the head 23 is controlled as to feeds and speeds by dials 28 and 29. The dials control the speed and feeds of the spindle 24 when the power transmission is connected to the spindle. The various other functions and opertions of a machine such as a machine tool is controlled by push buttons such as 30. The head 23 is provided with an opening which carries a dial 31. The dial 31 has a flange 32. The dial may be manually rotated to a selected position to determine the depth of the feed. The dial is then clamped in its selected position by means of a clamp 33.

Figure 3:
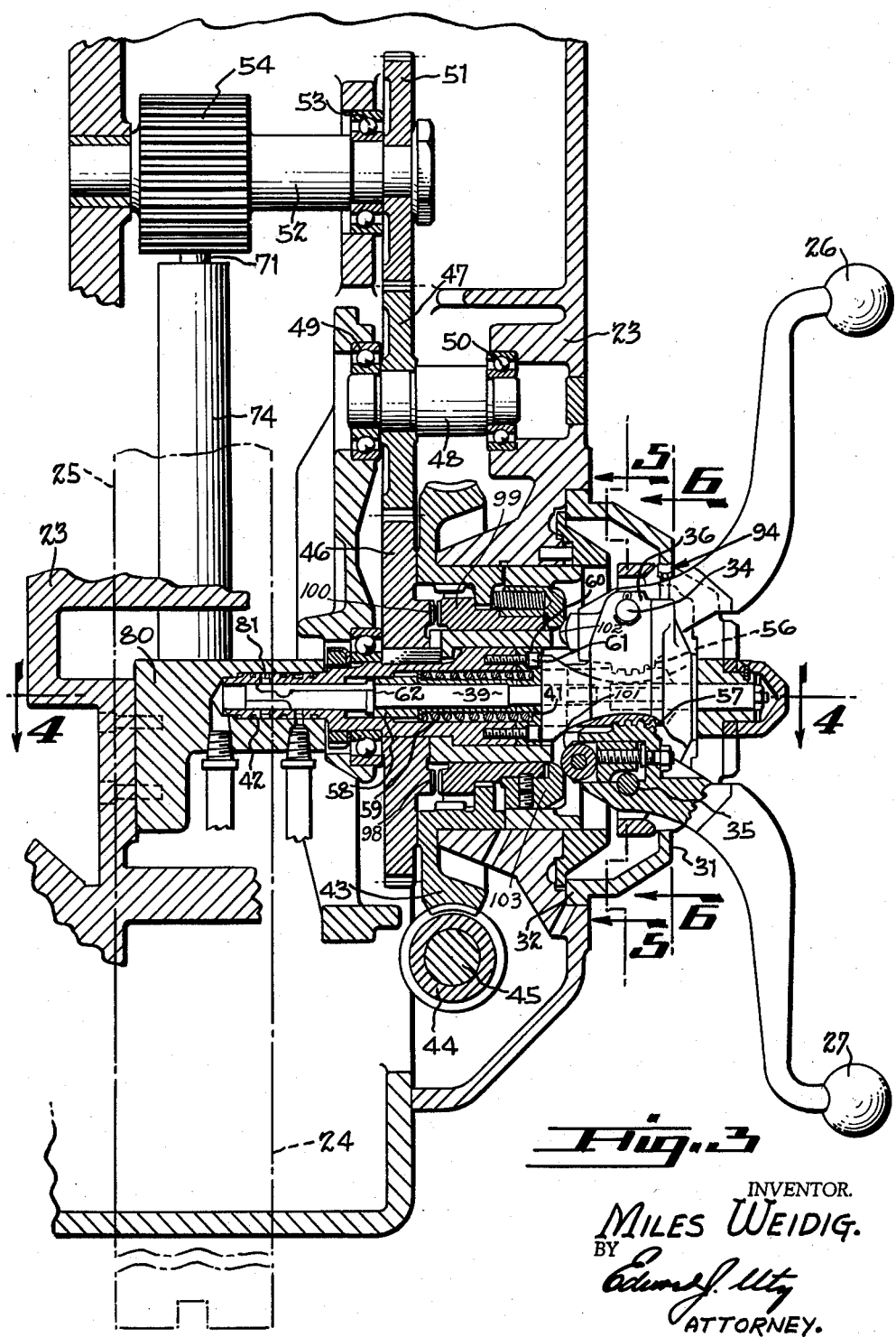
Figure 3 is a detailed, sectional view along the lines 3—3 of Figure 2.

Referring to Figure 3, I show the spindle levers 26 and 27 which are shown in the position in which the clutch is disengaged. The levers are pivoted about pins 34 and 35 to operate the clutch. The spindle levers 26 and 27 are mounted in a carrier 36. The spindle levers 26 and 27 fit within slots 37 provided in a carrier 36 so that the rotation of the spindle levers in the plane at right angle to the plane of rotation used to operate the clutch causes the rotation of the carrier 36. Within the carrier 36, I provide an intermediate sleeve 38 which is keyed to the carrier. The sleeve 38 is provided with a hole which receives one end of a rotatable valve spool 39 which is secured to the intermediate sleeve 38 by means of a pin 40. The rotatable valve spool 39 is mounted within a bearing 41. The other end is mounted within the valve sleeve 42.

Power is transmitted to a worm gear 43, through a worm 44, mounted on a power shaft 45. When the clutch is engaged the worm gear transmits power to a clutch gear 46, then through intermediate gear 47, mounted on a shaft 48, carried in bearings 49 and 50, mounted within the head 23. The intermediate gear 47 transmits power to a rack pinion gear 51 mounted on a rack pinion shaft which is journalled within a bearing 53. The rack pinion shaft 52 is provided with a rack pinion 54, which meshes with rack teeth 55 provided on sleeve 25.

The foregoing describes the power transmission for feeding spindle 24.

*Safety lock*

In the absence of oil pressure, there would be nothing to support the spindle so I have provided a safety lock for holding the spindle in a locked position when the machine is in its non-operating condition, or when by reason of an absence of oil pressure the invention described below is not operable. This includes teeth 56 and 57, which are integral with the levers 26 and 27, and which mesh with teeth which are provided on intermediate sleeve 38. The intermediate sleeve is pinned to the rotatable valve spool 39. The locking action is accomplished by moving the levers 26 and 27 to an engaged clutch position. The clutch (Figure 3) connects gear 46 with worm gear 43 to provide a feeding drive to the spindle 24. This drive originates through worm 44. Worm 44 also serves as a locking device which prevents worm gear 43 from rotating unless driven by worm 44. Serrated clutch teeth 98 on sliding clutch sleeve 99 are engageable with serrated teeth 100 on gear 46. The engagement of the teeth 98 is controlled by movement of levers 26 and 27 about pivots 34 and 35 to cause cam rollers 101 and 102 to move radially against cam ring 103 which is fixed to clutch sleeve 99. The rotatable valve spool is carried within a sleeve 42. Within the sleeve 42 an annular piston 58 is mounted which in addition to surrounding the rotatable spool 39 has bearing along one of its edges a spring 59 which is urged against a cap 60, secured to the valve sleeve by screws such as 61. The valve sleeve 42 is held in fixed position longitudinally. In the event of a power failure, the piston 58 is moved away from the clutch mechanism to cause the levers 26 and 27 to rotate around pins 34 and 35 to engage the clutch mechanism to connect the worm gear 43 to the driving gear 46, which holds the intermediate gears 47 and 51 in locked position. This prevents the pinion 54 from rotating, and thereby holds the spindle 24 and sleeve 25 in locked position. The valve spool 39 is pushed inwardly by the action of spring 59 against a shoulder 62, provided on the valve spool 39. The valve spool 39 being connected with the levers 26 and 27 through intermediate sleeve 38 causes the levers 26 and 27 to be moved.

The spindle 24 mounted within the sleeve 25, is slidable within the head 23.

Spindle 24 is provided with a threaded end 63 for receiving nuts 64 and 65. Nut 65 bears against a ball-bearing 66, which retains the spindle 24 within the sleeve 25. Bracket 67 is secured by the action of the nuts 64 and 65 against the bearing 66. The bracket 67 is provided with an extension 68, which has an opening 70 through which one end of a piston rod 71 passes. The piston rod is threaded at its upper end, and is secured to the bracket extension 68 by a pair of nuts 72 and 73. The piston rod is slidable within a cylinder 74. The cylinder 74 is provided with external threads 75 at its lower end, which are received in a tapped hole 76 provided within a block 77, which is held to the head 23 by means of screws (not shown).

Figure 4:
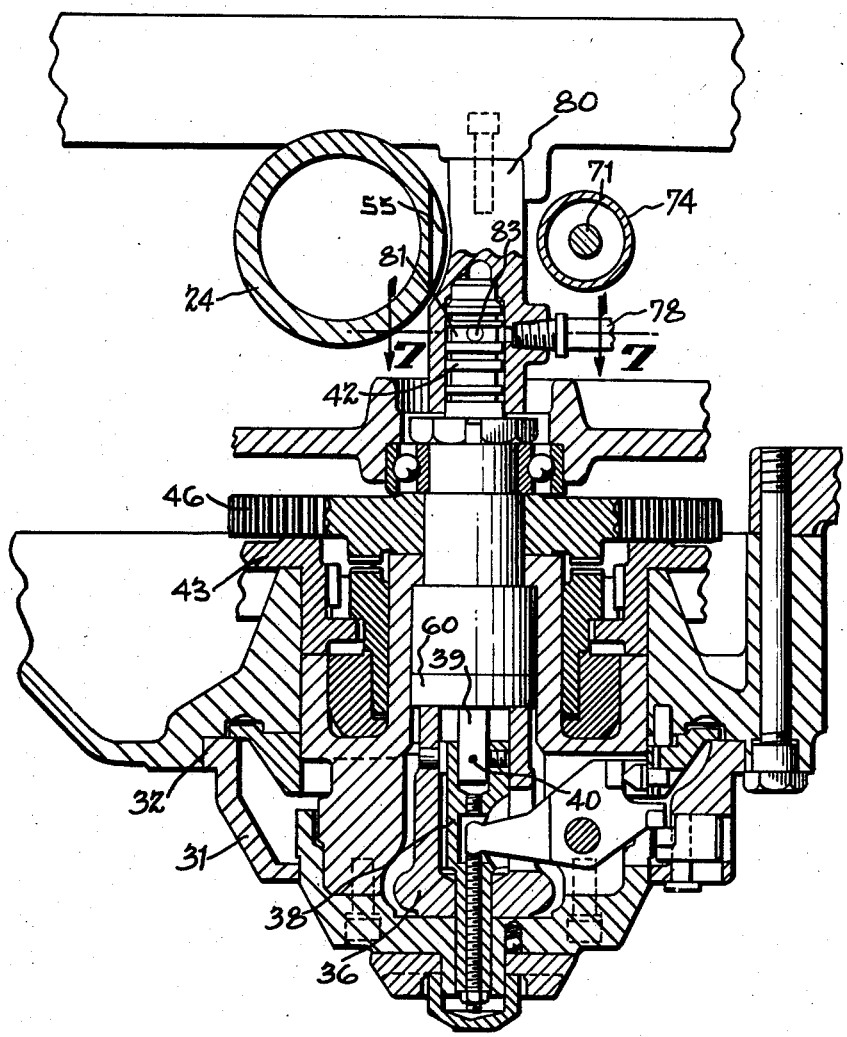
Figure 4 is a detailed, sectional view taken along the lines 4—4 of Figure 3.
Figure 7:
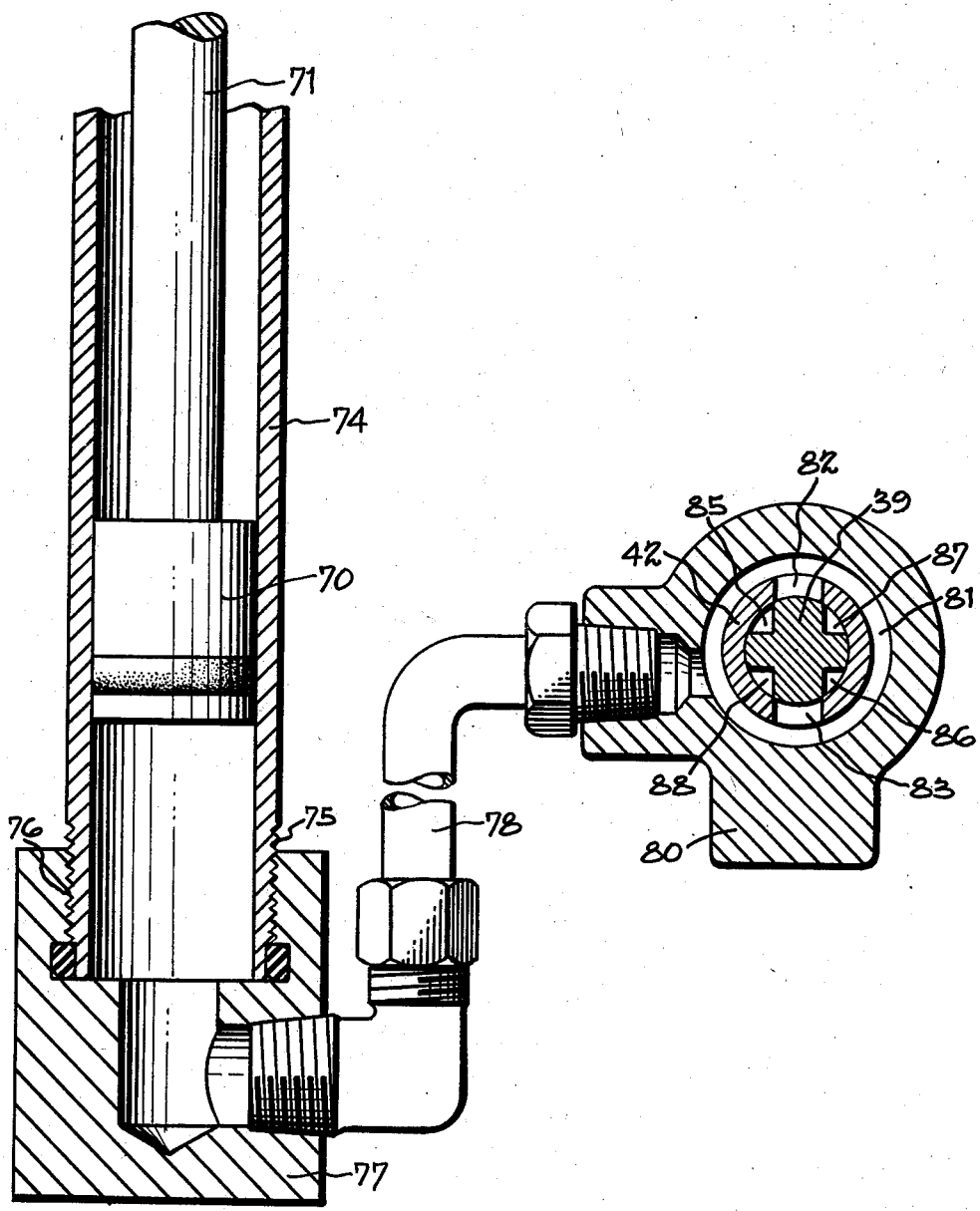
Figure 7 is a detailed, sectional view through the valve spool and sleeve, taken along the lines 7—7 of Figure 4.
Figure 6:
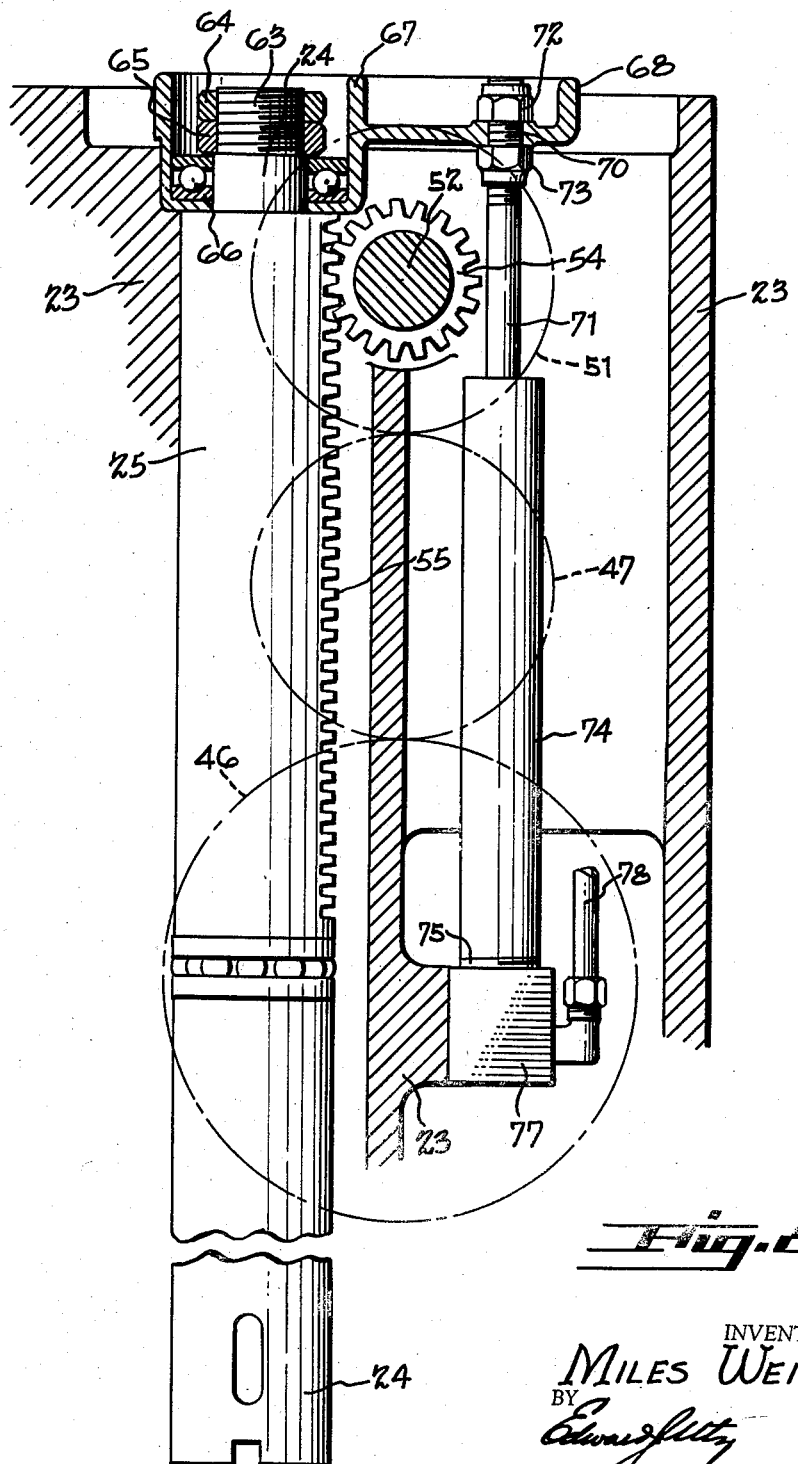
Figure 9:
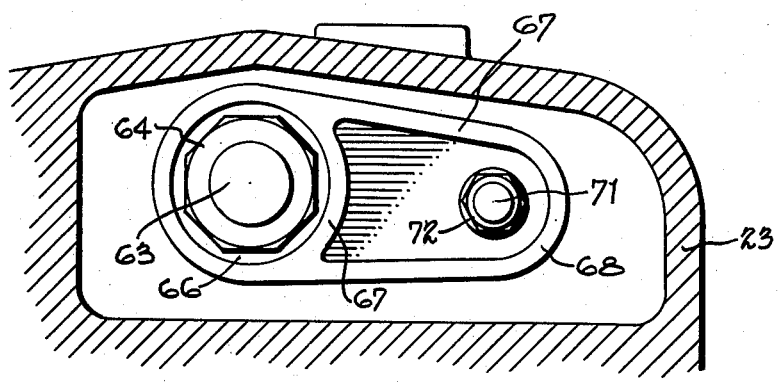
Figure 9 is a top plan view of the head showing the positions of the spindle and cylinder.
Figures 10, 11:
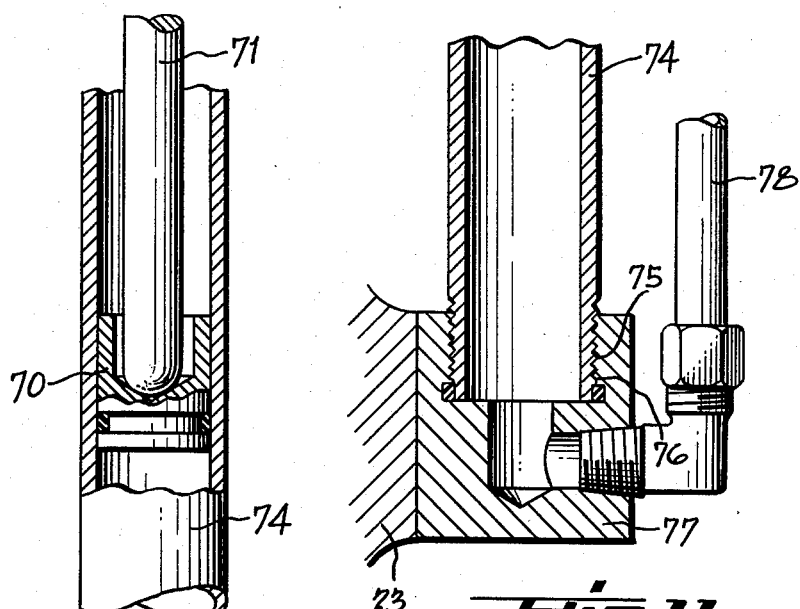
Figure 10 is a detailed, sectional view showing the cylinder with the piston and connecting rod.
Figure 11 is a detailed, sectional view showing the cylinder at its lower end.

The block is provided with an oil line 78. The piston rod 71 is provided with a piston head, which slides within the cylinder 74. Fluid pressure such as oil is supplied to the cylinder 74 through the line 78 (Figure 7). Line 78 is connected to a valve body 80. The valve body 80 shown in Figure 4 is so constructed that the valve sleeve 42 is rotatable therein. Valve spool 39 is rotatable within valve sleeve 42. An annular groove 81 is provided in the valve sleeve 42 which communicates with a pair of ports 82 and 83. The oil comes through line 78 into the member 80, which has an opening, which lines up with an annular groove 81 provided in the valve sleeve 42. The rotatable spool 39 is provided with four longitudinal passages. The longitudinal passages 87 and 88 carry pressure while the longitudinal passages 85 and 86 are connected to a vent line. The rotation of spool 39 in the direction which is clockwise as the parts are viewed in Figure 7 prevents oil under pressure from entering into port 82, and allows the oil in cylinder line 78 to vent through passageways 85 and 86. This permits the spindle 24 to move downwardly in response to the movement of the piston and piston rod. If the rotatable spool 39 is rotated counterclockwise, by means of the levers 26 and 27, fluid under pressure in passageways 87 and 88 is permitted to flow through line 78 to raise the piston and piston rod, to traverse the spindle upwardly. The valve sleeve 42 is keyed to and rotates with gear 46, which is connected to the spindle 24 through the intermediate gears, and through the pinion and rack previously described.

*Balancing action*

Figure 5:
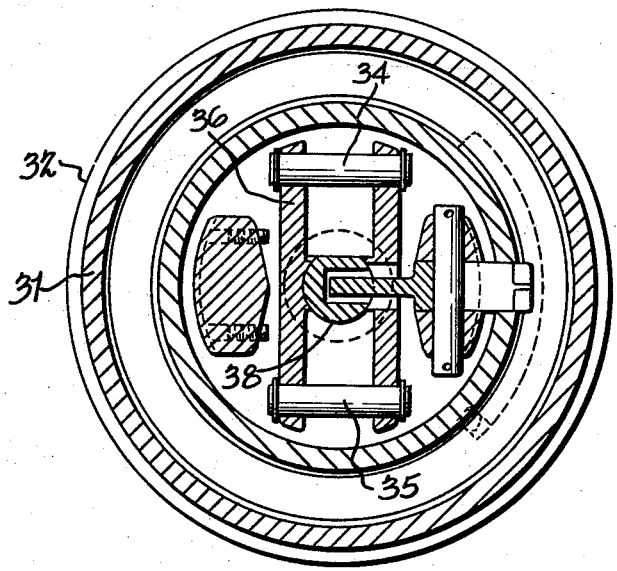
Figure 5 is a detailed, sectional view taken along the lines 5—5 of Figure 3.
Figure 6:
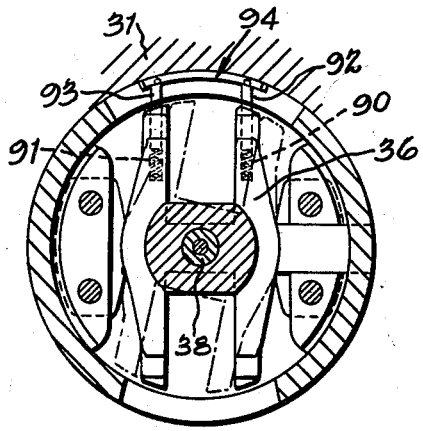
Figure 6 is a detailed, sectional view taken along the lines 6—6 of Figure 3.

Referring to Figures 5 and 6 mounted within carrier 36, I provide a pair of springs 90 and 91, which urge pins 92 and 93 outwardly against friction shoe 94. The friction shoe 94 bears against dial 31. The dial 31 is clamped in a stationary position for normal operation by hand clamp 33. When the machine is standing idle but with full hydraulic pressure present in passageways 87 and 88 (Figure 7) the valve spool 39 is held stationary by the action of friction shoe 94, and valve sleeve 42 is also stationary because the spindle 24 to which it is connected is in a stationary condition of balance.

The pressure in ports 82 and 83 and therefore in cylinder 74 is automatically held at a value which balances the weight of the spindle. This static pressure in ports 82 and 83 is produced by controlled leakage of oil under system pressure from passageways 87 and 88 into ports 82 and 83, and from ports 82 and 83 into vent passages 85 and 86. This type of servo valve is proportioned so that there is always some leakage present to permit a condition of continuous automatic balance.

If a load is now added to the spindle 24, the pressure in the cylinder 74 is overbalanced by the additional weight, and the spindle 24 moves downwardly very slightly causing the valve sleeve 42 to turn in a clockwise direction. This causes the leakage flow of oil under pressure from passageways 87 and 88 into ports 82 and 83 to increase and the leakage flow of oil from ports 82 and 83 into vent passages 85 and 86 to decrease. This causes the static pressure in ports 82 and 83 and therefore in cylinder 74 to increase just enough to balance the additional weight. This condition is achieved instantaneously and motion of spindle 24, and therefore valve sleeve 42 ceases in its new balanced position. If a load is removed from the spindle 24, a reverse action occurs again arriving at a balance.

Without further analysis, the foregoing detailed description will so fully and clearly disclose the invention that others may readily adapt it for other variations, by retaining one or more of the features which constitute essential characteristics of the generic or specific aspects of this invention, and therefore I claim my invention broadly as indicated by the appended claims.

Having thus described my invention, what I claim as new and useful and desire to secure by Letters Patent is:

1. An apparatus for balancing a traversing spindle in a machine tool in response to the addition of a weight load to the lower end of said spindle comprising, a spindle, a piston, a piston rod having its lower end abutting said piston and having its upper end secured to the upper end of said spindle, a cylinder within which said piston is mounted, said cylinder having an opening for admitting fluid pressure, a rotatable hydraulic valve for regulating the admission of said fluid pressure to said cylinder, and means for admitting fluid under pressure to said cylinder in response to the addition of a weight load to the lower end of said spindle balance the weight load added to said spindle.

2. An apparatus for balancing a traversing spindle in a machine tool in response to the addition of a weight load to one end of said spindle, comprising, a spindle, means for traversing said spindle, a piston, a piston rod having its lower end abutting said piston and having its upper end affixed to the upper end of said spindle, a cylinder within which said piston is mounted, said cylinder having a port for admitting fluid pressure, a rotatable hydraulic valve for regulating the admission of said fluid pressure to said cylinder, and means for rotating said hydraulic valve and for traversing said spindle.

3. An apparatus for balancing a traversable mounted spindle of a machine tool of the radial drill type, comprising, a traversing spindle, a sleeve within which said spindle is mounted, a head within which said spindle and sleeve are carried, gearing in said head for transmitting power to rotate said spindle and to traverse said sleeve and rotating spindle, a cylinder, a piston and piston rod movable within said cylinder, said piston rod at its lower end abutting said piston and at its upper end secured to said spindle, said piston and piston rod movable in response to the traversing movement of the spindle, said cylinder having an opening for the communication of fluid pressure, a valve regulating the flow of fluid pressure to said cylinder, said valve comprising a rotatable sleeve and a rotatable spool, said spool rotatable in said sleeve, a passageway for admitting fluid pressure into said sleeve, passageways in said spool through which said fluid pressure is passed to enter said cylinder to increase the static pressure in said cylinder to balance said spindle.

4. An apparatus for balancing a traversable spindle mounted in the head of a machine tool comprising, a spindle, a sleeve in which said spindle is carried, a pair of manually operable levers, a rotatable valve spool, said spool connected to said levers, a rotatable sleeve in which said spool is carried, a cylinder mounted in the head, a piston and piston rod in said cylinder, said piston rod at its lower end abutting said piston, a bracket connecting upper end of said piston rod to said spindle, fluid pressure passageways from said cylinder to said valve sleeve and valve spool, said valve spool rotatable in said valve sleeve, manipulation of the levers to rotate the valve spool causes fluid pressure to flow to said cylinder and a further manipulation of the levers causes rotation of the rotatable valve sleeve with reference to the valve spool to permit a variable volumetric flow of fluid to the cylinder whereby the static pressure in the cylinder assumes a value which will exactly balance the spindle and retain it in a position selected by the rotation of the manually operable levers.

5. An apparatus for traversing a spindle mounted in the head of a machine tool comprising, a spindle, a sleeve in which said spindle is carried, a pair of manually operable levers, a hydraulic valve mechanism connected to said manually operable levers, a cylinder, a piston rod movable in said cylinder, said piston rod affixed at its upper end to the spindle, the lower end of said piston rod abutting said piston, said cylinder having an opening whereby fluid pressure is communicated to and from said cylinder, controlled by said hydraulic valve mechanism in response to the speed of rotation of the manually operable levers.

6. An apparatus for traversing a spindle mounted in the head of a machine tool comprising a spindle, a sleeve in which said spindle is carried, a pair of manually operable levers, a valve spool and a valve sleeve in which said spool rotates said spool being connected to said levers, means for retaining said valve sleeve in a fixed position during the initial movement of the valve spool, and means for moving the valve sleeve during the initial movement of the valve spool, a cylinder, a piston and piston rod carried within said cylinder, said piston rod at its lower end abutting said piston and at its upper end secured to said sleeve in which said spindle is carried to said valve sleeve and valve spool for having a connection passage of fluid under pressure to said cylinder, a bracket connecting said spindle and said piston whereby the movement of the valve spool permits fluid pressure to flow to said cylinder to traverse said spindle in one direction.

7. An apparatus for traversing a spindle mounted in the head of a radial drill comprising a spindle, a sleeve in which said spindle is rotatably carried, a manually operable lever mechanism, a valve spool, a rotatable valve sleeve, said spool rotatable within said rotatable valve sleeve, in response to the movement of said lever mechanism, a cylinder mounted adjacent to said spindle, a piston contained within said cylinder, said cylinder being provided with an opening for receiving or discharging fluid in response to the positioning of the valve spool and valve sleeve by manipulation of the lever mechanism.

8. In a machine tool having a head with a spindle translatably mounted therein, means for traversing and rotating said spindle within said head, a hydraulic system for counterbalancing said spindle comprising the combination of a hydraulic valve having a valve sleeve and a valve spool, hydraulic supply passageways to said valve and hydraulic vents from said valve, said valve having variable port openings which permit fluid to flow through said supply passageways and vents at varying rates in response to the addition of a weight load to said spindle, a cylinder, a conduit from said cylinder to said valve, a piston and piston rod movable in said cylinder, said piston rod at its upper end connected to said spindle by means of a bracket and its lower end abutting said piston, said piston, piston rod and said spindle movable to a balanced position on the admission of hydraulic fluid to said cylinder in response to the addition of a weight load and means for holding the spindle and the load attached to it in balanced position.

9. A hydraulic counterbalancing system for a machine tool element comprising a valve body, fluid pressure connections to said valve body, a rotatable valve sleeve and a rotatable valve spool mounted within said sleeve, said sleeve and said spool rotatable within said valve body, means for initially rotating said valve spool to admit fluid pressure to said valve body, means for rotating said sleeve during the rotation of said spool to admit further fluid pressure to said body, a cylinder, a piston and piston rod movable within said cylinder, said piston rod at its lower end abutting said piston, said piston rod at its upper end affixed to said machine tool element and movable therewith and fluid pressure connections to said cylinder from said valve body to permit the flow of fluid from said body to said cylinder to counterbalance said machine tool element.

10. In a machine tool having a head with a spindle translatably mounted therein, means for traversing and rotating said spindle within said head at selected feeds and speeds, the combination of a hydraulic valve, a cylinder, a piston in said cylinder, connected to said spindle, said hydraulic valve regulating the traversing movement of said piston and spindle in response to variable weight loads attached to said spindle.

References Cited in the file of this patent

UNITED STATES PATENTS 2,027,706    Schaver et al. _____ Jan. 14, 1936